United States Patent Office 3,395,505
Patented Aug. 6, 1968

3,395,505
CONNECTION ELEMENT FOR
EXPANSION JOINTS
Jacques Edouard Lamy, Fontenay-aux-Roses, France, assignor to Societe d'Etude du Transport et de La Valorisation des Gaz Naturels du Sahara S.E.G.A.N.S., Paris, France, a French body corporate
Filed June 28, 1965, Ser. No. 467,560
Claims priority, application France, July 2, 1964, 980,432
8 Claims. (Cl. 52—276)

ABSTRACT OF THE DISCLOSURE

Connection element of two corrugations of a sheet metal expansion joint, provided at the angular intersection of two walls of a metal tank, the element having developable surfaces and being formed such that it allows contraction and expansion of the joint either in a direction perpendicular to the intersection of the walls or in a direction tending to modify the angle of intersection of the walls.

---

The present invention relates to a connection element for two corrugations of sheet metal expansion joints contained in two planes which make an angle therebetween.

Connection elements for corrugations of expansion joints are known which are contained in the same plane and intersect at right angles, these connection elements comprising an apical portion connected to the corrugations by portions constituting developable surfaces.

Now, in metal tanks having an angular intersection of two walls, the problem of the connection between two corrugations also exists. Indeed, if two corrugations of an angular intersection of two walls are joined along their lines of intersection, and these corrugations are subjected to forces which are created by the expansion or contraction of the sheet metal and directed along the intersection of these two walls, the rise of these corrugations increases or decreases and this tends to modify the angle of intersection of the two walls, but owing to the internal pressure of the tank and to the fact that the angle of intersection cannot change, the metal is highly stressed throughout the region of intersection of the corrugations.

The object of the present invention is to provide a connection element for two corrugations of sheet metal expansion joints for an angular intersection of two walls, which comprises a corner pleat connected to the two corrugations by portions constituting developable surfaces, the axis of symmetry of the corner pleat being located on the bisector of the angle of the connection corner of the walls.

In one embodiment of the connection element for trapezoidal corrugations, the corner pleat has a trapezoidal profile with a rise equal to that of the corrugations. The width of the apical portion of the corner pleat is less than the apical width of the corrugations and consequently the width of the base of the corner pleat is less than the width of the base of the corrugations.

A structure in which two walls of a metal tank are interconnected at an edge of intersection of the two walls. The two walls make a dihedral angle. The two ribs have a common plane of symmetry perpendicular to the edge of intersection. The ribs are not continuations of each other but are interrupted and interconnected in the region of the intersection edge by a connection gusset which has a flat ridge portion and two side portions which are symmetrical relative to the plane of symmetry common to the two ribs or corrugations. Each of the two side portions have the shape of an isoceles triangle. Each isoceles triangle has the corner thereof defined by the equal sides of the triangle located at the intersection edge of the two walls and the other two corners of each triangle are remote from the walls and symmetrical relative to the plane of symmetry of the walls and coincident with corners of two adjacent triangular portions constituting the other plane portions of the gusset and having two sides intersecting on the corner of the isosceles triangle located on the intersection edge of the walls. A polygonal portion is disposed symmetrical to the plane of symmetry of the ribs. Each of the other two corners of each isosceles triangle coincides wtih corners of the polygonal portion. The polygonal portion has one side which is parallel to the intersection edge of the walls and constitutes an edge defining a flat ridge portion of the corresponding rib, whereby the polygonal portion connects the ridge portion of the gusset with the flat ridge portion of the rib. The orientation of the equal sides of the isosceles triangle and the orientation of the sides of the adjacent triangular portions is such that the connection gusset is flexible and movable in a direction parallel to the intersection edge and defines a pivot on the intersection edge of the walls allowing the walls to undergo a relative angular movement of limited amplitude about their intersection edge.

Further features and advantages of the invention will be apparent from the ensuing description with reference to the accompanying drawings to which the invention is in no way limited.

Figure 1:
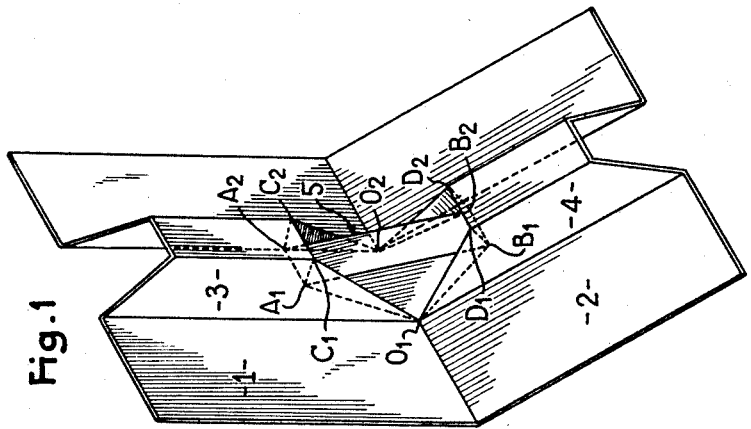
FIG. 1 is a perspective view of a connection element according to the invention for trapezoidal corrugations.

FIG. 1 shows two walls 1 and 2 making a dihedral angle therebetween, these two walls each having a corrugation or rib 3 and 4 of identical trapezoidal profile. The connection element comprises a corner pleat or corrugation 5 having the same profile as the corrugations 3 and 4. This corner pleat 5 comprises an apical rectangular portion $A_1A_2B_1B_2$ and two lateral triangular portions $O_1A_1B_1$ and $O_2A_2B_2$. This pleat is connected to the corrugations by two rectangular portions $A_1A_2C_1C_2$ and $B_1B_2D_1D_2$ and four triangular portions $O_1A_1C_1$, $O_1B_1D_1$, $O_2A_2C_2$ and $O_2B_2D_2$.

As all the portions constitute developable surfaces, the rise of the corner pleat is equal to that of the corrugations since $A_1A_2$ is equal to $C_1C_2$ and the base of the pleat $O_1O_2$ is equal to that of the corrugations.

Figure 2:
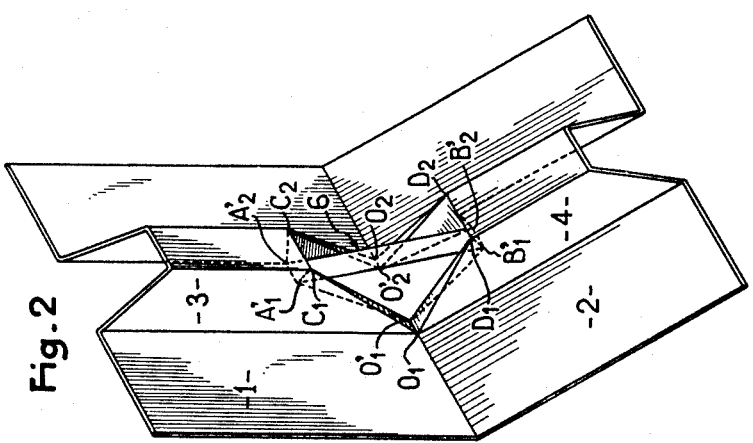
FIG. 2 is a perspective view of another embodiment of a connection element according to the invention for trapezoidal corrugations.

According to a preferred embodiment of the invention shown in FIG. 2, the corrugations 3 and 4 are connected by a corner pleat or corrugation 6 composed of an apical rectangular portion $A'_1A'_2B'_1B'_2$ whose width is less than the width of the apical portion of the corrugations and two lateral triangular portions $O'_1A'_1B'_1$ and $O'_2A'_2B'_2$, the rise of the corner pleat 6 being equal to that of the corrugations. This pleat is connected to the corrugations by two trapezium portions $A'_1A'_2C_1C_2$ and $B'_1B'_2D_1D_2$ and eight triangular portions $O'_1A'_1C_1$, $O_1O'_1C_1$, $O_1O'_1D_1$, $O'_1B'_1D_1$ on one hand and $O'_2A'_2C_2$, $O_2O'_2C_2$, $O_2O'_2D_2$, $O'_2B'_2D_2$ on the other.

As these correspond to developable surfaces and the rise of the corrugations and that of the corner pleat being equal, $C_1C_2$ must be equal to $O_1O'_1 + A'_1A'_2 + O_2O'_2$.

Figure 3:
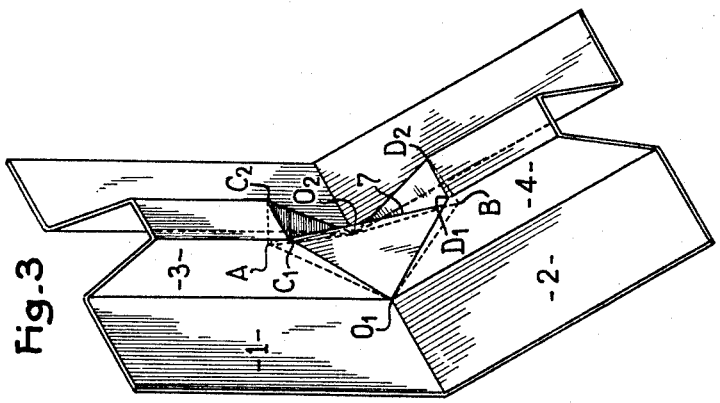
FIG. 3 is a perspective view of a third embodiment of a connection element for trapezoidal corrugations.

In a third embodiment of the invention shown in FIG. 3, the connection element between the two corrugations 3 and 4 comprises a triangular corner pleat or corrugation 7 having two triangular portions $O_1AB$ and $O_2AB$, the apical portion of pleat being reduced to an edge $AB$ which is connected to the apical portions of the corrugations by two triangular portions $AC_1C_2$ and $BD_1D_2$; the sides of the corner pleat 7 are connected to the sides of the corrugations by four triangular portions $O_1AC_1$, $O_1BD_1$, $O_2AC_2$ and $O_2BD_2$.

These portions constitute with the corrugations developable surfaces.

Figure 5:
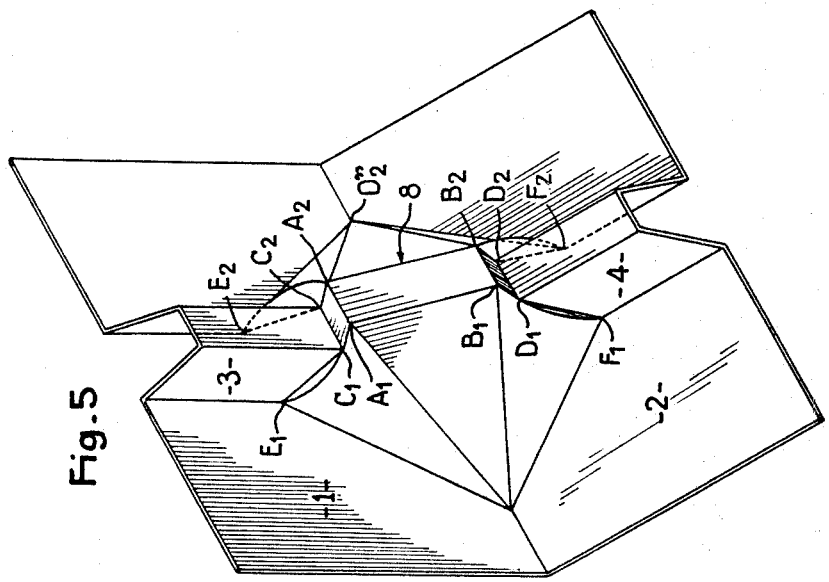
FIG. 5 is a perspective view of a connection element similar to that shown in FIG. 4, wherein some edges are curved.
Figure 4:
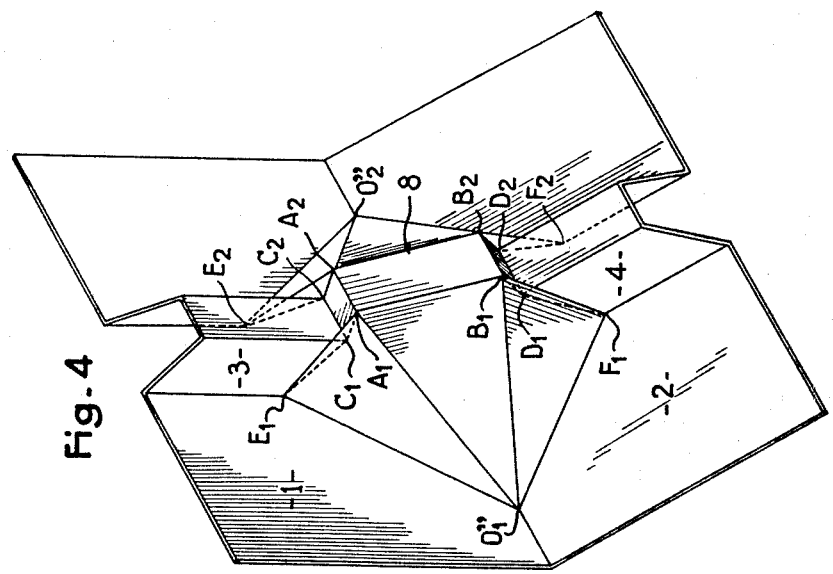
FIG. 4 is a perspective view of an embodiment of a connection element having a corner pleat or corrugation whose rise is greater than that of the trapezoidal corrugations.

Two embodiments of the connection element are shown in FIGS. 4 and 5 wherein the base of the corner pleat or corrugation is wider than the base of the corrugations.

In FIG. 4 the connection element comprises a corner pleat or corrugation 8 composed of a rectangular apical portion $A_1A_2B_1B_2$ and two lateral triangular portions $O''_1A_1B_1$ and $O''_2A_2B_2$. This pleat is connected to the corrugations 3 and 4 and to the wall 1 and 2 by developable surfaces embodied by two rectangular portions $A_1A_2C_1C_2$ and $B_1B_2D_1D_2$ and eight triangular portions $E_1A_1C_1$, $O''_1A_1E_1$, $O''_1F_1B_1$, $F_1B_1D_1$ on one hand and $F_2B_2D_2$, $O''_2F_2B_2$, $O''_2E_2A_2$, $E_2A_2C_2$ on the other.

The connection element shown in FIG. 5 comprises the same corner pleat or corrugation 8 as the element shown in FIG. 4 but the developable connection surfaces are different in that the edges $E_1A_1$, $E_2A_2$, $F_1B_1$, $F_2B_2$ are arcs of a circle. The eight triangular connection portions therefore constitute eight developable conical surfaces.

In particular, the corrugations and the corner pleats can have a rectangular, triangular, or omega cross-sectional shape. In the latter case, the apical portions have a rounded shape and the connection portions are cylindrical surfaces the convexity of which is directed toward the plane of symmetry of the corner pleat.

Similarly, the edges or corners of the connection element can be replaced by radiused or rounded portions having a small radius of curvature.

Although specific embodiments of the invention have been described, many modifications and changes may be made therein without departing from the scope of the invention as defined in the appended claims.

Having now described my invention what I claim as new and desire to secure by Letters Patent is:

1. A structure comprising two walls of a metal tank interconnected at an intersection edge, each wall comprising a rib having a trapezoidal section constituting an expansion joint, the two ribs having a common plane of symmetry perpendicular to the intersection edge, said two ribs being interrupted and interconnected in the region of said intersection edge by a connection gusset means which comprises a ridge portion and two side portions which are symmetrical relative to said plane of symmetry, said gusset means having other plane portions, each of said two side portions having the shape of an isosceles triangle, each triangle having the corner thereof defined by the equal sides of said triangle located on said intersection edge, the other two corners of each triangle being remote from said walls and symmetrical relative to a bisecting plane of said walls and coincident with corners of two adjacent triangular portions constituting said other plane portions of said gusset means and having two sides intersecting on the corner of said isosceles triangle located on said intersection edge, a polygonal portion symmetrical relative to said plane of symmetry of said ribs, each of said other two corners of each of said isosceles triangle coinciding with corners of said polygonal portion, said polygonal portion having one side which is parallel to said intersection edge and constitutes an edge defining a ridge portion of the corresponding rib, whereby said polygonal portion connects said ridge portion of said gusset means with the ridge portion of said rib, the orientation of said equal sides of said isosceles triangle and the orientation of the sides of said adjacent triangular portions being such that the connection gusset means is flexible and movable in a direction parallel to said intersection edge and defines a pivot on said intersection edge allowing said walls to undergo a relative angular movement of limited amplitude about said intersection edge.

2. A structure as claimed in claim 1, wherein one of the sides of said adjacent triangular portions coincides with the edge of the corresponding side portion of the interrupted rib.

3. A structure as claimed in claim 1, wherein one of the sides of said adjacent triangular portions coincides with a cut edge of said corresponding wall.

4. A structure as claimed in claim 3, wherein each of said adjacent triangular portions is connected to the corresponding rib and the corresponding polygon by a plane triangular connection portion having a base coincident with one of the sides of said polygon.

5. A structure as claimed in claim 3, wherein each of said adjacent triangular portions has a curvilinear side and a curved connection surface having a rectilinear base coincident with the corresponding side of said polygon.

6. A structure as claimed in claim 1, wherein said polygon is a rectangle.

7. A structure as claimed in claim 1, wherein the polygon is a triangle.

8. A structure as claimed in claim 1 wherein said polygon is a trapezium, each of said adjacent triangular portions being contiguous with a plane triangular connection portion having a base coincident with said intersection edge and a side which is not adjacent the corresponding one of said adjacent triangular portions and coincides with the corresponding cut edge of the corresponding rib.

References Cited

UNITED STATES PATENTS

| | | | |
|---|---|---|---|
| 3,321,881 | 5/1967 | Alleaume | 52—276 |
| 2,913,010 | 11/1959 | Whitney. | |
| 3,118,523 | 1/1964 | Girot | 52—582 X |
| 3,299,598 | 1/1967 | Alleaume | 52—630 X |

FOREIGN PATENTS 97,233  1/1964  Denmark.

HENRY C. SUTHERLAND, *Primary Examiner.*